Inventors
PERCY JACKSON
ERNEST TAYLOR
By Mawhinney & Mawhinney
Attys.

Aug. 7, 1962   P. JACKSON ET AL   3,048,155
OPPOSED PISTON, TWO-STROKE CYCLE, DIESEL ENGINES
Filed June 4, 1959   6 Sheets-Sheet 5

Inventors
PERCY JACKSON
ERNEST TAYLOR
By Mawhinney & Mawhinney
Attys.

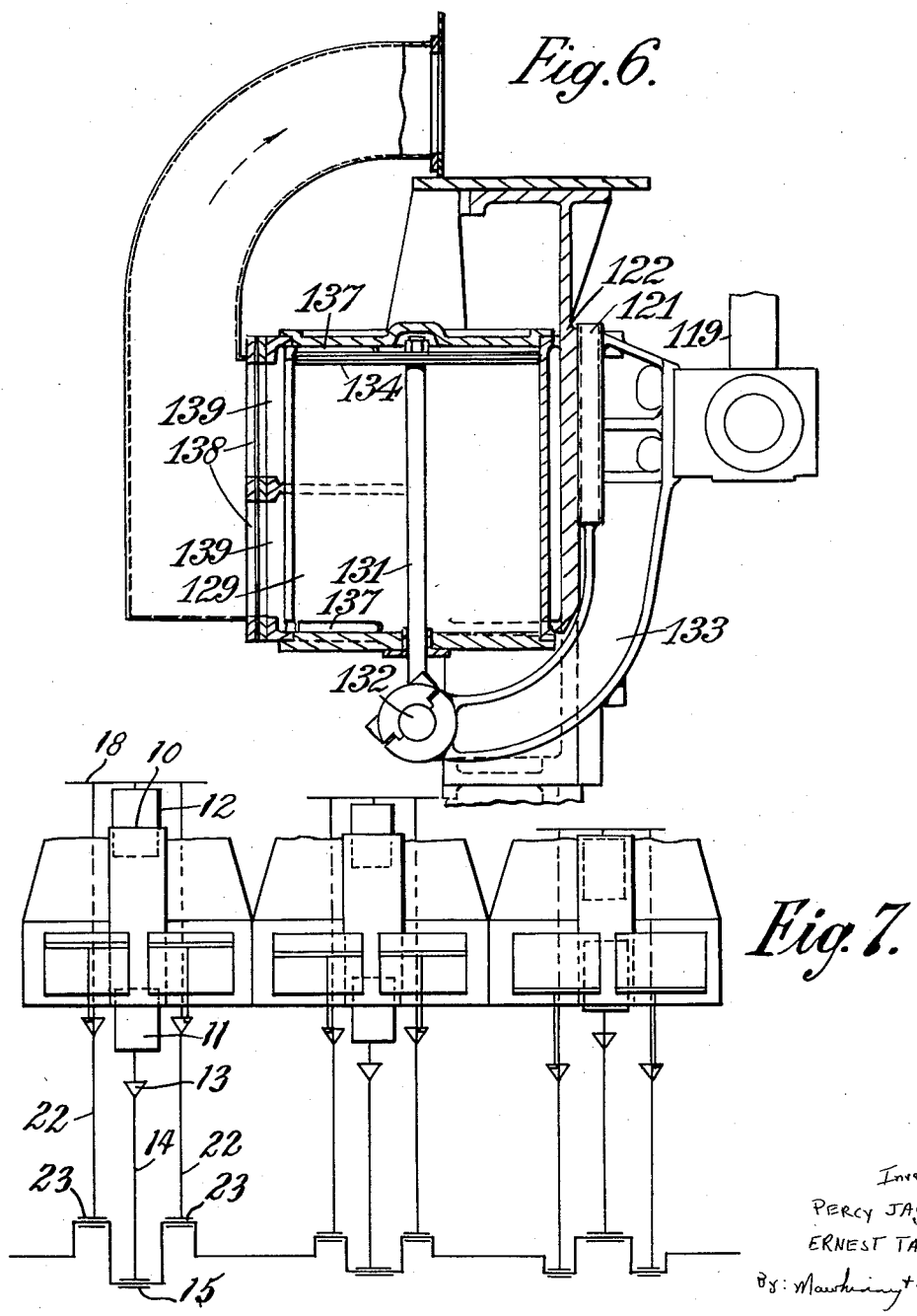

United States Patent Office 3,048,155
Patented Aug. 7, 1962

3,048,155
OPPOSED PISTON, TWO-STROKE CYCLE, DIESEL ENGINES
Percy Jackson and Ernest Taylor, Sunderland, England, assignors to William Doxford & Sons (Engineers) Limited, Sunderland, England, a British company
Filed June 4, 1959, Ser. No. 818,112
Claims priority, application Great Britain June 4, 1958
3 Claims. (Cl. 123—51)

The invention relates to opposed piston diesel engines operating on the two-stroke cycle and of the kind (hereinafter referred to as the kind described) in which the engine cylinder (or each cylinder of a multi-cylinder engine) is supported by an entablature or framework, in which one of the pistons of the cylinder is connected to the centre throw of a three-throw crankshaft and in which the other piston is connected by side rods, at opposite sides of the cylinder respectively, to the two side throws of the crankshaft.

The invention is concerned with means for supplying air for scavenge and/or combustion purposes to the cylinder, or cylinders, of an engine of the kind described.

The invention, in its broad aspect, provides an engine of the kind described characterised by at least one reciprocatory air pump for the supply of air to the engine cylinder or cylinders, which is driven from one of the side rods.

Preferably there are, for the engine cylinder or at least one of them in the case of a multi-cylinder engine, two air-pumps driven from the two side rods of the cylinder respectively.

The pump or pumps may be contained within, or substantially within, the compass of the entablature and when, as is usual, the entablature or a part thereof, is enclosed to constitute an air reservoir, the pump or pumps are preferably within or substantially within, the enclosure.

When the pump is contained within an air reservoir as just described, it may discharge directly into the reservoir and it may draw its air through an inlet in the reservoir.

Alternatively the pump may be below the reservoir and deliver into it through a conduit.

Figure 1:
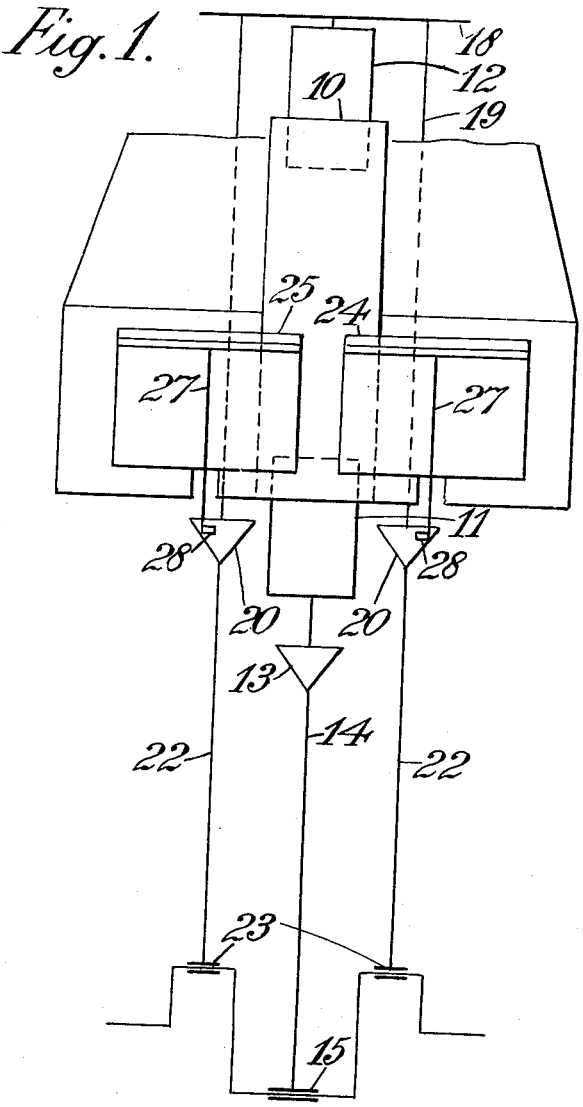
Figure 2:
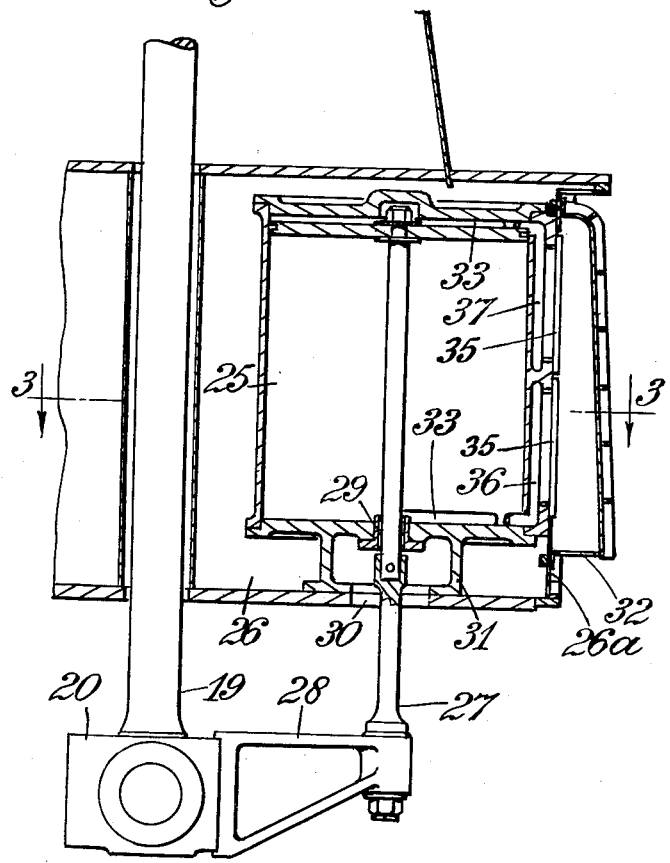
Figure 3:
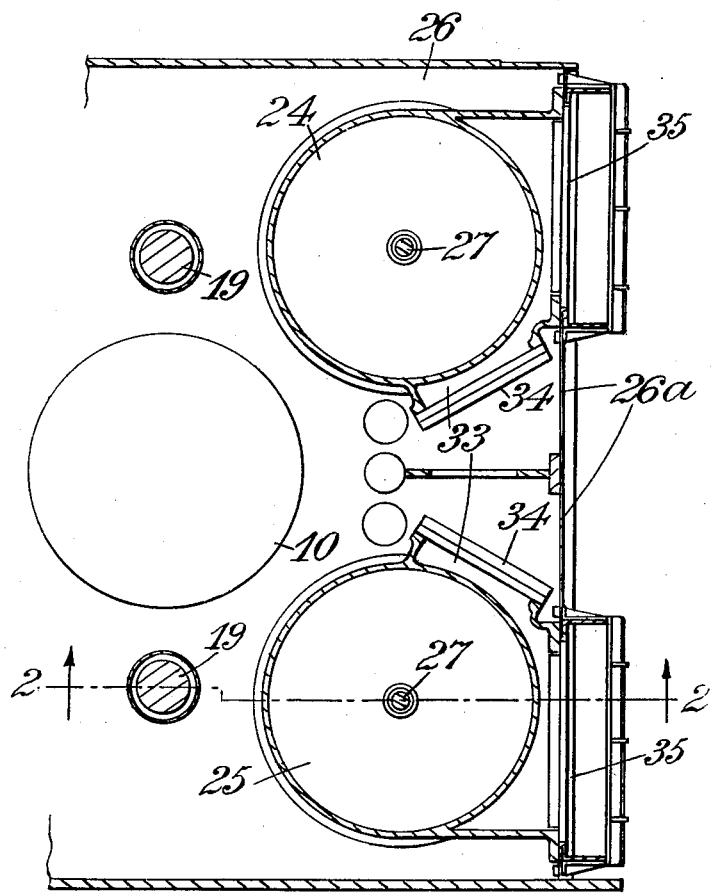
Figure 4:
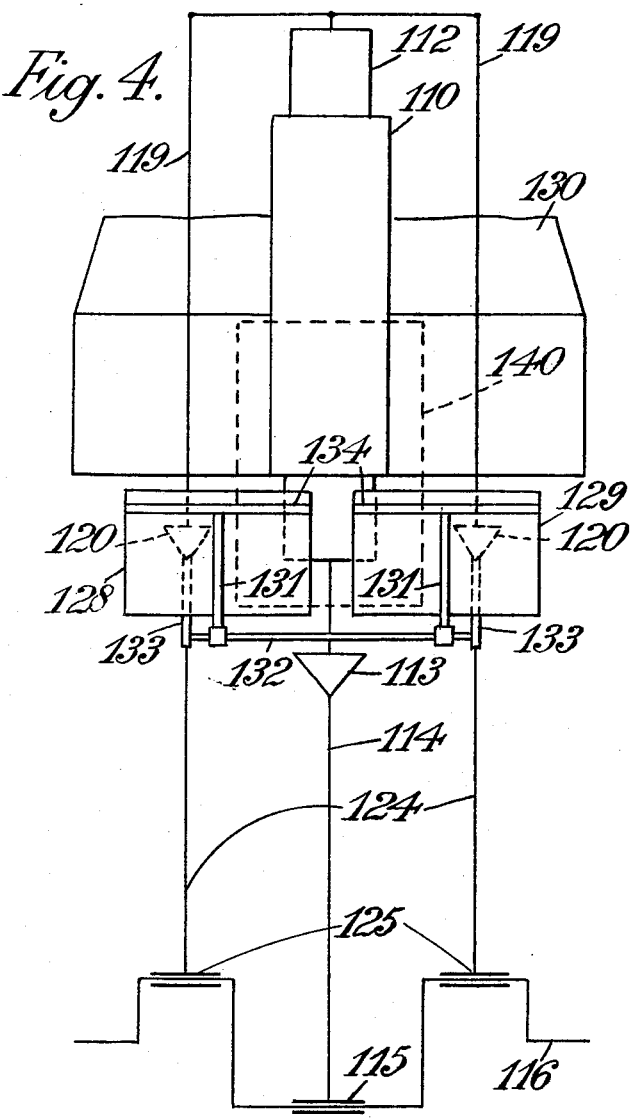
Figure 5:
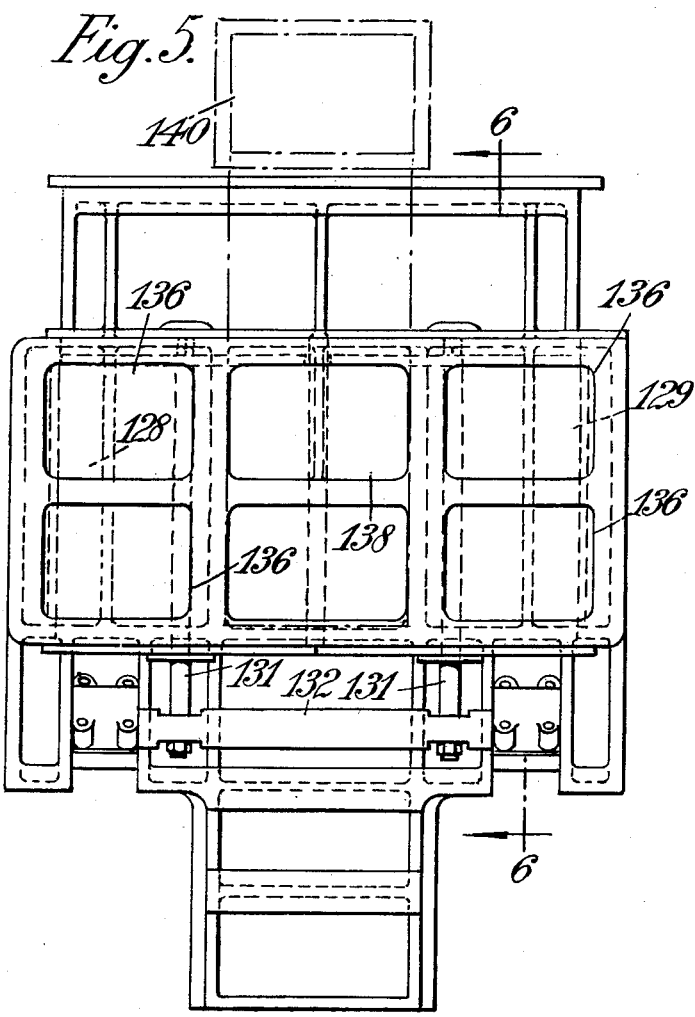

Two specific constructions of engines embodying the above and other features of the invention will now be described, by way of example and with reference to the accompanying drawings in which:

FIGURE 1 is a diagram indicating the general arrangement of one cylinder of one of the engines, FIGURE 2 is a vertical section, on the line 2—2 in FIGURE 3, through one of the air pumps embodied in the engine, FIGURE 3 is a horizontal section, on the line 3—3 in FIGURE 2, showing both air pumps and their relation to the engine cylinder, FIGURE 4 is a view, similar to FIGURE 1, showing the second engine, FIGURE 5 is a rear elevation showing the pumps of the engine in FIGURE 4, FIGURE 6 is a section on the line 6—6 in FIGURE 5, and FIGURE 7 is a diagrammatic view of the general layout of the engine.

The engine forming the subject of the first example and shown in FIGURES 1–3 is an upright multi-cylinder, two-stroke cycle marine engine of the kind described. That is, each working cylinder 10 contains two pistons 11, 12 of which the lower piston, 11, is connected via a cross-head and guide 13 and a connecting rod 14 with the center throw 15 of three throws of a crankshaft, 16. The upper piston, 12, is connected by a cross-beam 18 to two side rods 19 which are attached at their lower ends to cross-heads 20 having shoes running on guides (not shown). The cross-heads are in turn connected by connecting rods 22 to the outer throws 23 of the crankshaft 16.

The engine has, for each cylinder, 10, two upright double-acting piston pumps 24, 25 for the supply of air for scavenging and combustion. The pumps are contained wholly within an enclosed entablature 26 which serves as a reservoir for the air and they are operated by means of piston rods 27 connected to arms or brackets 28 attached to cross-heads 20 for the side rods 19. The piston rods 27 extend downwardly through sealing glands 29 in the bottom of the pump cylinders and openings 30 in the bottom wall of the entablature reservoir, the openings being sealed by annular distance pieces 31 between the bottoms of the pump cylinders and the bottom of the reservoir. The two pumps are on the same side of the engine and in this example their centres are spaced a little further apart than the side rods 19. They may however be spaced at the same distance as the side rods or, as later described, nearer together than the rods.

In the side wall 26a the entablature opposite to each pump, there is an opening covered by two automatic inlet valves 35 controlling passageways 36 and 37 leading from two inlets 32 respectively to the opposite ends of the pump cylinder. Other short passageways, 33, lead from these ends to automatic discharge valves 34 opening directly into the entablature.

The engine forming the subject of the second example and shown in FIGURES 4–6 is also of the opposed piston, two-stroke cycle kind having, for each cylinder 110, two working pistons of which the lower piston is connected via a cross-head and guide 113 and a connecting rod 114 with the centre throw 115 of three throws of a crankshaft 116. The upper piston 112 is connected by a cross-beam to two side rods 119 which are attached at their lower ends to cross-heads 120 having shoes 121 running on guides 122. The cross-heads are in turn connected by rods 124 to the outer throws 125 of the crankshaft.

The engine has, for each cylinder 110, two upright double-acting piston pumps 128, 129 for the supply of air for scavenging and combustion, the pump cylinders being attached to the backs of the guides 122. In this example the pumps are located beneath an enclosed entablature 130 which serves as a reservoir for the air. The pumps are operated by means of piston rods 131 secured at their lower ends to a cross-beam 132 which, at its ends, is clamped to brackets 133 dependent from the cross-heads and shoes 120, 121. The piston rods carry pistons 134 working in the pump cylinders.

Each pump cylinder has two inlet openings covered by automatic inlet valves 136 controlling passageways leading to inlet ports 137 in the cylinders. The pumps also have two outlet openings controlled by automatic discharge valves 138. These valves control outlet passageways 139 leading from the pump cylinders into a conduit 140 which leads into the entablature.

It is an advantage of the constructions described that they enable the air pumps to be embodied to a large extent within the compass of the engine and save a substantial part of the space which has previously been required for large air pumps located at one side of the engine and driven from the centre cross-heads by levers or brackets and arranged to supply sufficient air for two or more cylinders.

The pumps according to the invention may, by suitable construction of the air reservoir, be arranged to supply air for all the engine cylinders or each pair of pumps may supply only the cylinder by which the pumps are driven.

We claim:
1. In a multi-cylinder opposed piston two-stroke cycle diesel engine comprising
(a) a plurality of upright cylinders,
(b) an entablature supporting said cylinders in spaced apart relation in a row lengthwise of the engine,
(c) a crankshaft having a center throw and an outer throw on each side of the center throw for each cylinder,
(d) two opposed pistons working in each of said cylinders,
(e) one piston of each cylinder being connected to the center throw,
(f) means including two side connecting rods, one for each of the outer throws and located on the lengthwise center line of the row of cylinders and parallel to the axis of the said cylinder, one on each side of said cylinder for connecting the other piston to each of the outer throws,
(g) two reciprocating air pumps each comprising an upright pump cylinder,
(h) a pump piston working in said pump cylinder,
(i) a pump piston rod having one end attached to said pump piston and the other end projecting from the pump cylinder,
(j) said two pumps being located both on the same side of the row of engine cylinders with at least one of the pump cylinders between a pair of engine cylinders as viewed transversely of the row and, as viewed in plan, projecting into the space between the cylinders,
(k) the pump cylinders being each substantially opposite its side connecting rod,
(l) and a bracket on each side connecting rod extending radially therefrom and attached at its outer end to the projecting end of the piston rod of the pump cylinder opposite that rod.

2. An engine as claimed in claim 1 having the entablature enclosed to constitute an air reservoir and the pumps arranged to deliver into said reservoir.

3. An engine as claimed in claim 2 in which one at least of the pumps is contained substantially within the reservoir.

References Cited in the file of this patent
UNITED STATES PATENTS

| | | |
|---|---|---|
| 1,089,711 | Kaemmerling | Mar. 10, 1914 |
| 2,434,584 | Purdie | Jan. 13, 1948 |
| 2,619,079 | Minder | Nov. 25, 1952 |

FOREIGN PATENTS

| | | |
|---|---|---|
| 204,755 | Great Britain | Oct. 1, 1923 |
| 381,534 | Great Britain | Oct. 3, 1932 |